United States Patent [19]
Kovar

[11] Patent Number: 4,589,497
[45] Date of Patent: May 20, 1986

[54] SPRING TOOTH HARROW, AND SPRING TOOTH AND TOOTH CLIP FOR A HARROW

[76] Inventor: Jack J. Kovar, 1329 - 3rd Ave., S., Anoka, Minn. 55303

[21] Appl. No.: 610,200

[22] Filed: May 14, 1984

[51] Int. Cl.$^4$ .............................................. A01B 23/02
[52] U.S. Cl. .................................... 172/707; 172/643; 56/400
[58] Field of Search ............... 172/707, 708, 643, 763; 56/400, 400.21; 248/231.6, 316.6; 24/525, 335; 411/531, 122, 125, 126, 127, 546, 547

[56] References Cited

U.S. PATENT DOCUMENTS

| | | | |
|---|---|---|---|
| 707,624 | 8/1902 | Niles | 172/707 X |
| 2,502,769 | 4/1950 | Warnke | 56/400 |
| 3,049,184 | 8/1962 | Lohrman | 172/707 |
| 3,150,721 | 9/1964 | Van der Lely | 172/544 |
| 3,171,243 | 3/1965 | Johnston | 172/707 X |
| 3,710,872 | 1/1973 | Kovar | 172/707 |
| 3,976,145 | 8/1976 | Blair | 172/763 X |
| 4,304,306 | 12/1981 | Maust | 172/142 |

FOREIGN PATENT DOCUMENTS 87909 1/1921 Switzerland .................... 172/707

Primary Examiner—Richard J. Johnson
Attorney, Agent, or Firm—Henry C. Kovar

[57] ABSTRACT

A spring tooth harrow for land treatment has an improved spring tooth and an improved tooth attachment clip; the tooth has a tine, a helical coil spring, and a mounting lug having an inboard leg, a semi-circular medial leg and a straight outboard leg, the legs are co-planar and have a divergent angle between them; the clip is L-shaped and has a first leg with a rear shoulder and a fastener aperture and a second leg with a taper divergent towards the first leg; the clip second leg goes in between the lug inboard and outboard ends and biases the tooth into proper position, the second leg also absorbs a significant part of the lateral loads upon the tooth, and applies these loads directly to a structure of the harrow.

24 Claims, 5 Drawing Figures

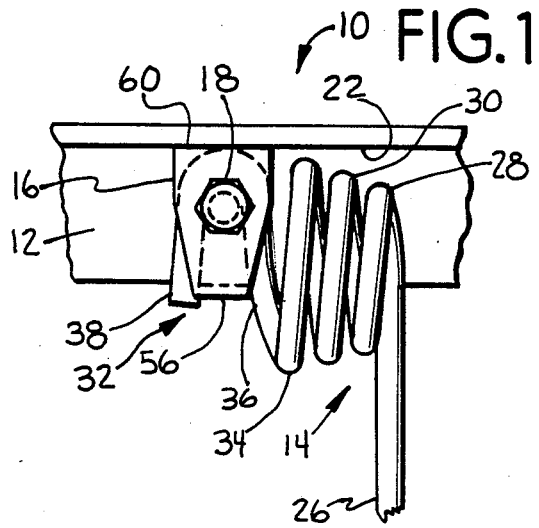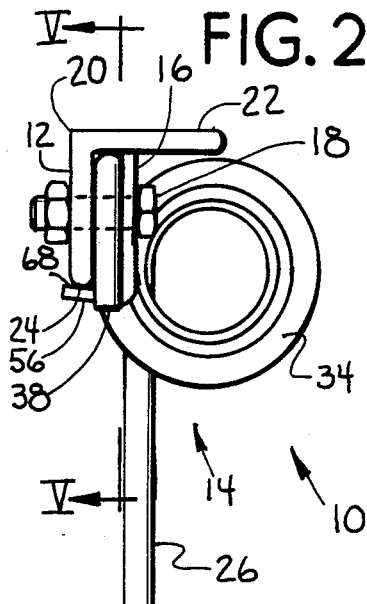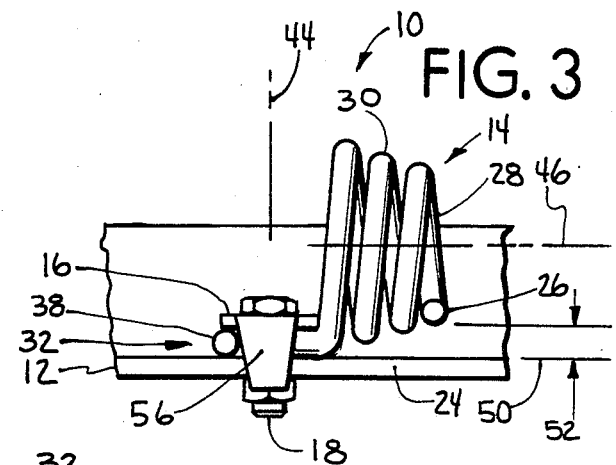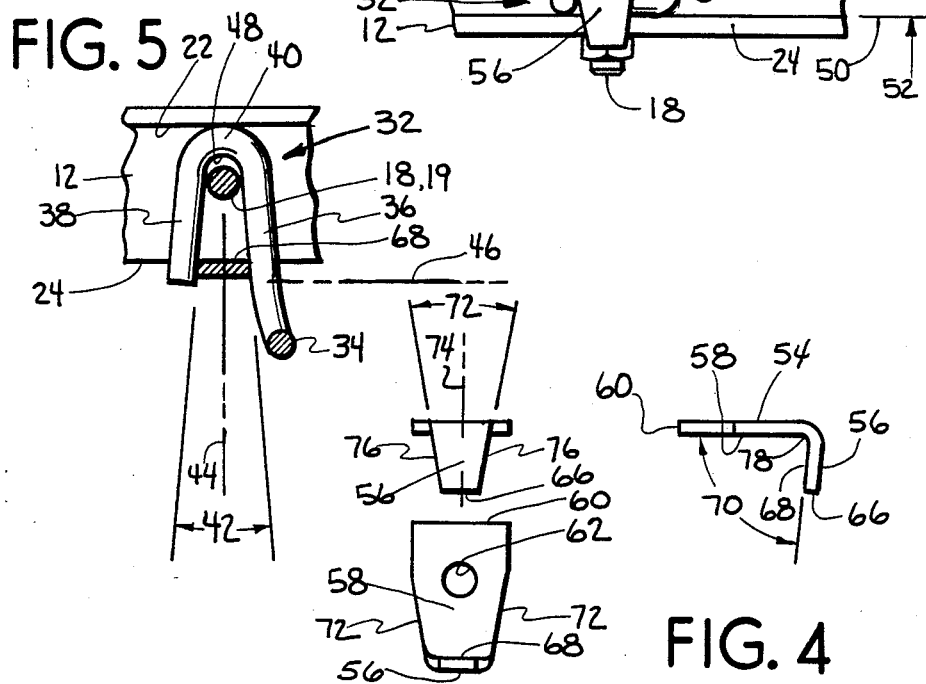

SPRING TOOTH HARROW, AND SPRING TOOTH AND TOOTH CLIP FOR A HARROW

BACKGROUND OF THE INVENTION

1. Field of the Invention

This invention pertains to a spring tooth harrow, to a spring tooth for a harrow, and to an attachment clip for securing a spring tooth to a harrow.

2. The Prior Art

Spring tooth harrows were devised many years ago. The first designs had the helical spring coils mounted around a tubular structural member. This is an excellent and very strong method of devising a harrow and of mounting a helical coil harrow tooth. Unfortunately, if you brake a tooth, you must dis-assemble the entire harrow to replace the tooth. The customers comprising the harrow marketplace found this unacceptable.

Therefore, the spring tooth was mounted on the outside of the harrow frame so it could be replaced when broken, and so the harrow frames could be fabricated without teeth, and teeth added by the retailers or farmers.

The most commonly used cross-members in harrows are tubes and angle iron sections. The harrow teeth are fastened to these sections. The tube does not lend itself to advantagous securement of a helical coil spring tooth, if the helical coil is not around the tube. The angle iron is easy to fasten to, but it has proven very difficult to effectively fasten and mount a spring tooth to and retain strength and avoid breakage.

The problem is that the tooth has to be secured in both the fore-aft axis and the side-to-side axis. As the harrow is pulled over large clumps of earth, rocks, debris and the like, the teeth tend to be bent both rearward and forward, and also to either side. If the teeth turn sideways, the harrow will no longer work. It is very difficult to mount spring teeth without developing stress concentrations in the mounting eye or lug of the spring tooth. More often than not the spring tooth breaks in the mounting lug. Then the fastener will break in some instances. An example of this type of harrow is in C. B. Blair, U.S. Pat. No. 3,976,145.

The most recent and closest known example of prior art is a spring tooth harrow utilizing an angle iron frame to which a spring tooth having a helical coil spring is attached. The angle iron has a lower flange in which an aperture is pierced. A slot is notched in the lower edge of the angle lower flange. The tooth has a U-shaped lug in which the outboard leg of the U-shape has a forwardly bent toe that goes into the notch. A bolt and washer secure the lug to the angle iron. This device weakens the angle iron and contributes to bent frames, and gives excessive stress concentration in the lug because the mounting footprint is too small, and experiences too much lug breakage or tooth bending. This harrow is subject of H. L. Kovar, U.S. Pat. No. 3,710,872 of Jan. 16, 1973.

OBJECTS OF THE INVENTION

It is an object of the present invention to provide a spring tooth harrow having an improved attachment of a spring tooth.

It is an object of the present invention to provide a spring type harrow tooth having an improved mounting lug.

It is an object of the present invention to provide a new spring tooth attachment clip for securing a spring tooth to the frame of a harrow.

It is an object of the present invention to provide a new and improved harrow frame and spring tooth retainer clip for future securement of a spring tooth thereto.

These and other objects of the present invention will become manifest to those versed in the art upon review of the teachings herein.

SUMMARY OF THE INVENTION

According to the principles of the present invention, a spring tooth harrow has:

(a) a planar frame flange, (b) a harrow spring tooth having a suspended tine and an intermediate spring and a cantilevered generally U-shaped mounting lug compressed against the flange, (c) a tooth attachment clip having an L-shape with a first leg compressed upon the U-shaped lug, and (d) a clip second leg abutting against an outer lip of the flange and extending between an inboard leg and outboard leg of the lug, and a fastener extending through the clip, lug and flange compressively mounting the lug of the tooth to the frame; with the fastener and the second leg transversely fixing the tooth.

A spring type harrow tooth has a single suspended tine, an intermediate helical coil spring, and a generally U-shaped mounting lug having:

(1) a generally straight inboard leg extending from the coil spring, (2) a generally semi-circular medial leg extending from the inboard leg, (3) a straight outboard leg extending generally parallel to the inboard leg, the inboard and medial and outboard legs being co-planar; and (4) an outwardly divergent angle in the lug between the inboard an outboard legs.

An L-shaped spring tooth attachment clip for securing a spring tooth to the frame of a harrow has:

(a) a first leg with an inner surface for compressing a lug of a spring tooth, (b) structure in the first leg for securement of the clip to a frame of a harrow, (c) a second leg at a generally right angle to the first leg, the second leg having a length greater than the diameter of wire used for the spring tooth;

(d) a rear shoulder on the first leg and wider than the second leg, and (e) an acute angle between opposed lateral edges of the second leg, the angle being in the range of 10–30 degrees.

The combination of a harrow frame and a spring tooth retainer clip has a frame with first and second flanges and a lip on the first flange, an L-shaped tooth attachment clip having a first leg with a length generally the same as the first flange, a second leg at a generally right angle to the first leg and with a length greater than the wire diameter of a tooth for the frame, a first leg rear shoulder wider than the second leg and abutted against the second flange, a second leg inner surface abutted on the lip, a fastener through the first leg and first flange with the clip being rotatably fixed to the frame by the abutting shoulder and second leg, and in which the fastener and opposing lateral edges of the clip second leg jointly form structure for transversely fixing the tooth to the frame.

These and other objects, advantages and features of the present invention will become apparent to those versed in the art after consideration of the following detailed description and the drawing a part hereof.

BRIEF DESCRIPTION OF THE DRAWINGS

FIG. 1 is a forward looking elevational view showing a part of the harrow of the present invention with the spring tooth and tooth clip of the present invention;

FIG. 2 is a side elevational view thereof;

FIG. 3 is an upward looking plan view from the bottom thereof;

FIG. 4 is a projected 3-view drawing of the clip of the present invention and of FIG. 1; and FIG. 5 is a sectional elevational view taken through lines V—V of FIG. 1.

DESCRIPTION OF THE PREFERRED EMBODIMENT

The principles of the present invention are particularily useful when embodied in a spring tooth harrow, a portion of which is illustrated in FIG. 1 and generally indicated by the numeral 10.

The harrow 10 has several flange members, one of which is shown and indicated by the numeral 12. The flanges 12 form at least part of the frame of the harrow 10. The flanges 12 are usually part of an L-shaped section 20, commonly called angle-iron. Several of these L-sections 20 are usually located one in front of the other, and fore-aft members (not shown) tie the L-sections 20 together to form a frame of the harrow 10. The L-section 20 has a second flange 22 and the previously mentioned flange 12 can be considered the first flange 12 and it has an outer lip 24 which is advantageously used as will subsequently be explained.

The harrow 10 has a plurality of spring teeth. One such harrow spring tooth is generally indicated by the numeral 14. Each tooth 14 is held to the planar flange 12 by an attachment clip 16 and a fastener 18 extending through an aperture 19 within the flange 12. The aperture 19 and fastener 18 are closer to the second flange 22 than to the lip 24.

The tooth 14 has an elongate suspended tine 26 which is suspended from a suspended end 28 of an intermediate helical coil 30 which may have its coil 30 wound in a conical form as is shown. A generally U-shaped mounting lug 32 (or mounting end) extends from a first coil 34 of the coil spring 30.

The lug 32 has an inboard leg 36, an outboard leg 38 and a medial leg 40 between the inboard and outboard legs 36, 38.

The inboard leg 36 and the outboard leg 38 have between them an acute angle 42 which is divergent from the medial leg 40 and which is preferrably less then fifteen degrees and greater than five degrees; the optimal acute angle 42 is in the range of seven and one-half to twelve and one-half degrees. The acute angle 42 is symetrical about a theoretical plane 44 which is perpendicular to a theoretical axis 46 of the coil spring 30 and which is centered between the inboard and outboard legs 36,38. The inboard leg 36 is generally straight and extends tangentially from the first coil 34 and preferrably at the same angle as the nominal pitch angle of the coil spring 30. One-half of the acute angle 42 is preferrably equal to the coil spring 30 pitch angle. The medial leg 40 is generally semi-circular and has an internal radius 48 which is greater than a radius of the diameter of the fastener 18. The medial end 40 extends beyond the largest diameter of the coil spring 30 which positively spaces the coil spring 30 from the second flange 22. The radius 48 is larger than a radius of the diameter of the wire of the spring tooth 14, and less than the diameter of the wire of which the tooth 14 is made. The mounting lug 32 lies entirely in a theoretical plane 50 which is co-planar with the flange 12 and from which the tine 26 is spaced. This spacing 52 is approximately the diameter of the wire from which the tooth 14 is made. The preferred diameter of wire for the tooth 14 is 0.375 inch. The outboard leg 38 has a straight length longer than the inboard leg 36 and longer than the height of the flange 12 so that the outboard leg 38 extends out beyond the flange lip 24.

The L-shaped spring tooth attachment clip 16 for securing the tooth 14 to the harrow 10 has a first leg 54 and a second leg 56 at a generally right angle to the first leg 54. The first leg 54 has a generally flat inner surface 58 for compression of the mounting lug 32 to the flange 12. A rear shoulder 60 is wider than and parallel to the second leg 56. The shoulder 60 abuts against the second flange 22. An aperture 62 is provided for the fastener 18. The aperture 62 is nearer to the shoulder 60 than to the second leg 56. The second leg 56 has a length 64 between the first leg 54 and a distal end 66 which is greater than the diameter of the wire of the tooth 14 for which the clip 16 is specifically intended. The inner surface 68 of the second leg 56 abuts against the flange outer lip 24. An included angle 70 between the first leg 54 and the second leg 56 is less than ninety degrees and preferrably greater than eighty degrees; the optimal angle 70 is about eighty-five degrees. The second leg 56 has a taper 72 diverging from the distal end 66 to the first leg 54, and then along the first leg 54 toward the aperture 62. The taper 72 preferrably does not extend beyond the aperture 62. The taper 72 is an acute angle in the range of ten to thirty degrees; an optimal angle for the taper 72 is about twenty degrees. The taper 72, the second leg 56, the first leg 54 and the shoulder 60 are all preferrably symetrical about a theoretical centerline plane 74 which is perpendicular to and centered upon the first leg surface 58 at the centerline of the aperture 62 and the fastener 18 which ends up being through the aperture 62. On each side of the second leg 56 are opposed lateral edges 76 which form the taper 72 and which transversely fix and bias the tooth mounting lug 32 as will be described. The clip aperture 62 registers with the flange aperture 19 so tht the shoulder 60 abuts against the second flange 22 and so that the clip second leg 56 abuts against the flange lip 24. Between the first leg 54 and second leg 56 is an internal radius 78 which is less than the radius of the wire used for making the tooth 14.

In use of the harrow 10, tooth 14 and clip 16 of the present invention, the harrow 10 is utilized to break up plowed farm field, to flatten fields and for finer preparation of land for crop planting and the like. The tines 26 take a tremendous physical beating and the clip 16 and mounting lug 32 co-operatively mount the tooth 14 to the harrow 10 in an exceptionally reliable and strong manner. The tooth 14 is placed against the flange 12, the clip 16 is placed over the mounting lug 32 and the fastener 18 is loosely fastened. As the fastener 18 is tightened up, the clip lateral edges 76 are driven between the inboard and outboard legs 36, 38. The acute angle 42 between the legs 36,38 is engaged by the lateral edges 76 and the mounting lug 32 is biased upward until the medial leg 40 is against the second flange 22 and spaced above the fastener 18. As the clip 16 is finish tightened, the mounting lug 32 is compressively clamped securely between the clip 16 and the flange 12. In operation, loads from the tine 26 are passed through the coil spring 30 to the mounting lug 32 and then to the clip 16 and flange 12. The loadings imparted to the clip 16 are transferred by the rear shoulder 60 to the second flange 22 and by the second leg 56 to the first flange 12 and the clip 16 is radially fixed to the angle section 20 jointly by the abuttment of both the clip shoulder 60 and the second leg inner surface 68. Lateral bending of the tooth 14 is re jointly by the fastener 18 which contacts the inboard and outboard legs 36, 38 on their straight length and below the medial leg 40, and by the clip second leg 56 which with its lateral edges 76 picks up the outer ends of the inboard and outoard legs 36,38 and transfers their loading directly to the outer lip 24. The inboard leg 36 and outboard leg 38 both apply their fore-aft loads directly adjacent the flange lip 24 and the widest and largest possible footprint of the mounting lug 32 upon the first flange 12 is attained for minimal stress concentration in the lug 32.

This clip 16 and mounting lug 32 and combination of the frame with the L-shaped section 20 and clip 16 significantly expand the footprint of load application into the L-section 20 of the harrow 10, and reduce the actual and stress loads upon the fastener 18. The loads and stresses in the mounting lug 32 are minimized. The second flange 20 and the frame of the harrow 10 are now stronger because the first flange 12 no longer needs to be notched to transversely index the spring tooth 14.

Although other advantages may be found and realized, and various and minor modifications suggested by those versed in the art, be it understood that I wish to embody within the scope of the patent warranted hereon, all such embodiments as reasonably and properly come within the scope of my contribution to the art.

I claim as my invention:

1. A spring tooth harrow, comprising
   (a) a planar flange with an aperture therethrough, said flange being an integral portion of the frame of a harrow;
   (b) a harrow tooth having
      (1) a suspended tine on one end,
      (2) an intermediate spring coil, and on the other end,
      (3) a cantilevered generally U-shaped mounting lug having a first side compressed against the frame flange;
   (c) a tooth attachment clip having an L-shape with
      (1) a first leg facing the frame flange and being compressed upon a second side of the U-shaped lug, and
      (2) a second leg at a generally right angle to the first leg, said second leg extending in between and through an inboard leg and a cantilevered outboard leg of the U-shaped mounting lug;
   (d) fastening means extending through said flange aperture, between the inboard and outboard legs, and through the clip first leg, for compressively mounting the tooth U-shaped lug between the flange and the clip with said lug being fixed both fore and aft and transversely with respect to the harrow frame; and
   (e) in which the planar flange is the first flange of an L-shaped section, the first clip leg having a rear shoulder abutting against a second flange of the section, the second clip leg having an inner surface extending out onto and abutting against an outer lip of the first flange, said tooth being transversely located and fixed jointly by the fastening means and said second leg.

2. A spring tooth harrow according to claim 1, in which the rear shoulder is wider than a width across the second leg inside surface which is contacting the front lip, and at least as wide as the width of a medial leg in between the first and second legs.

3. A spring tooth harrow according to claim 1, in which the clip has means for biasing the tooth lug inward toward the second flange, said biasing means being opposed lateral edges of the second leg, said edges being pressed in between the legs of the U-shaped mounting lug.

4. A spring tooth harrow according to claim 1, in which
   (a) the U-shaped mounting lug has an inboard leg, an outboard leg and a semi-circular medial leg there between, there being an acute oblique angle between the inboard and outboard legs, said angle being divergent from the medial leg; and including
   (b) means on the clip second leg for engaging the inboard and outboard legs in the divergent angle for biasing the mounting leg on the flange.

5. A spring tooth harrow according to claim 4, in which said biasing means biases the medial leg into a position beyond and spaced from the fastening means, so that the fastener means bears directly against the inboard or outboard leg.

6. A spring tooth harrow according to claim 4, in which said biasing means are the opposed lateral sides of the second leg.

7. A spring tooth harrow according to claim 6, in which said opposed sides are tapered divergently toward the first leg.

8. A spring tooth harrow according to claim 7, in which the included angle of the opposed sides is in the range of 10 to 30 degrees.

9. A spring tooth harrow according to claim 7, in which the taper continues divergently into the first leg and on said first leg toward the fastening means.

10. A spring tooth harrow according to claim 6, in which the included angle of the opposed divergent sides is symetrical about a plane perpendicular to and centered upon the first leg.

11. A spring tooth harrow according to claim 4, in which the second leg abuts against an outer lip of the frame flange.

12. A spring tooth harrow according to claim 1, in which an included angle between the first and second legs is more than 80 degrees but less than 90 degrees and in which the first leg is longer than a height of the first flange.

13. A spring tooth harrow according to claim 1, in which the mounting lug has a cantilevered outboard leg extending over and downwardly past an outer and lower lip of the first frame flange, said lower lip being complete and devoid of notches, said outboard leg being transversely abutted against the clip second leg at a level below the lip.

14. An L-shaped spring tooth attachment and retainer clip for securing a spring tooth to the frame of a harrow, said clip having:
   (a) a first leg having a generally flat inner surface for compression of a spring tooth to a harrow frame;

(b) single securement means generally transversely centered in the first leg for securement of the clip over a mounting lug of a spring tooth and to a harrow frame with a single fastener through the lug and said means;

(c) a second leg at a generally right angle to the first leg, said second leg having a length greater than the diameter of wire of a spring tooth for which the clip is specifically intended;

(d) a rear shoulder on the first leg on an end opposite from the second leg, said rear shoulder being wider than the second leg, said securement means being closer to the rear shoulder than to the second leg; and (e) in which said second leg has an acute angled taper between its opposed lateral sides, said acute angle being in the range of 5–15 degrees and being convergent from the first leg so that the second leg is narrowest at its distal end, said taper being generally symetrical about a clip centerline lying perpendicular to the plane of the first leg, said lateral sides and fastener through the securement means jointly forming structure for transversely fixing the tooth to the harrow frame, said shoulder and inner surface of said second leg jointly forming structure for rotationally fixing the clip to the harrow frame.

15. A spring tooth attachment clip according to claim 14, in which said taper extends on the first leg toward the securing means and in which the taper does not extend beyond the securing means.

16. A spring tooth attachment clip according to claim 14, in which an included angle between the first and second legs is less than 90 degrees and in greater than 80 degrees, and is a nominal 85 degrees.

17. A spring tooth attachment clip according to claim 14:
   (a) in which the first leg rear shoulder is parallel to and facing away from the second leg, said shoulder being engagable with and against a rigid structural surface of a harrow frame;
   (b) in which the first leg has opposed sides with a convergent taper toward and to the second leg with said first leg taper being between the securement means and the second leg; and
   (c) in which the rear shoulder, second leg, first leg and all of the taper on both legs are all generally symetrical about the clip centerline.

18. A spring tooth attachment clip according to claim 17, in which the second leg has a taper length of about twice the diameter of the wire of the spring tooth.

19. The combination of a harrow frame and attachment clip for a spring tooth, comprising:
   (a) a harrow frame having at least one generally transverse structural member, said structural member having a first flange, a second flange adjoined to said first flange, and a lip on said first flange, said lip being faced away from said second flange and being spaced from said second flange by said first flange;
   (b) at least one L-shaped spring tooth attachment clip for securing a spring tooth to said frame, said clip having
      (1) a first leg having a generally flat inner surface for compression of a generally U-shaped spring tooth mounting lug to the frame, said first leg having a length generally the same as the length of the first flange,
      (2) a second leg at a generally right angle to the first leg, said second leg having a length greater than the diameter of the wire of a spring tooth for which the harrow frame and clip are specifically intended,
      (3) a rear shoulder on a distal end of the first leg, said shoulder being parallel to and faced away from the second leg and being abutted against the second flange,
      (4) an inner surface on the second leg, said inner surface being parallel to the shoulder and the second flange, and being abutted against the lip of the first flange, and
      (5) a pair of opposed lateral edges on each side of the second leg, said edges being spaced apart by said inner surface;
   (c) couplementary registering fastener apertures through each of the first flange and the first leg, said apertures being nearer to the second flange and the shoulder than to the lip and the second leg;
   (d) a compressive type fastener through said aperture for tightening the first leg toward the first flange to physically compress and fix the spring tooth mounting lug there between and to fix the spring tooth fore and aft with respect to the frame;
   (e) said clip being rotationally fixed with respect to the structural member jointly by the abuttment of the shoulder against the second flange and by the abutment of the inner surface against the lip; and
   (f) in which the fastener and second leg opposed edges jointly form means for transversely fixing the spring tooth with respect to the frame.

20. The frame and clip of claim 19, in which said shoulder is wider than said second flange.

21. The frame and clip of claim 19, in which the opposed edges of the clip second leg are tapered and form an acute angle wedge having an included angle in the range of 10–30 degrees for compression into the tooth mounting lug.

22. The frame and retainer of claim 21, in which the taper continues divergently into the first leg from the second leg.

23. The frame and retainder of claim 22, in which the taper terminates before going past the fastener aperture.

24. A spring type harrow tooth, having:
   (a) a single elongate normally suspended cantilevered tine;
   (b) an intermediate conical helical coil spring, said tine extending from a normally suspended smallest diameter end coil of said spring;
   (c) a cantilevered generally U-shaped mounting lug extending from a mountable largest diameter end coil of said spring; said lug having
      (1) a generally straight inboard leg extending generally tangentially from the largest diameter coil of the spring and generally at the nominal pitch angle of the coiled spring,
      (2) a generally semi-circular medial leg extending transversely from the inboard leg, said medial leg being extended outward beyond the largest diameter end coil so that every coil of said spring is spaced from the second flange of an angle iron frame when the medial leg is mounted against an inside surface of a first flange of the frame and abutted against the second flange,
      (3) a straight outboard leg extending alongside the inboard leg with there being an outwardly divergent acute included angle in the range of 5 to 15 degrees in between the inboard and outboard legs, said acute angle being symetrical about a plane perpendicular to an axis of the coil spring and centered through the medial leg and between the inboard and outboard legs, said acute angle also being generally equal to twice the nominal pitch angle of the coil spring, (4) said inboard and medial and outboard legs all being co-planar and jointly defining an outward facing flat single mounting plane generally parallel to a centerline of the coil spring and spaced forward of the largest diameter end coil and the tine, so that when the tooth is mounted to said first flange, each coil and the tine are both positively spaced from the first flange, and in which (5) the outboard leg has a straight length longer than a straight length of the inboard leg; and with (d) there being a spacing between the inboard and outboard legs at where the inboard leg is tangent to the coil, which spacing is substantially wider than a distance between the inboard and outboard legs immediately adjacent the medial leg, so that the lug and the tooth can be positively and strongly laterally positioned on an unnotched harrow frame by a clip and a fastener with the fastener being in the medial leg and the clip having a second leg in the spacing wherein the second leg has a substantially greater width than a diameter of the fastener.

* * * * *